United States Patent [19]

Simmons et al.

[11] Patent Number: 4,586,720
[45] Date of Patent: May 6, 1986

[54] NECK SEAL

[75] Inventors: Thomas E. Simmons, Westford; Ralph F. Divirgilio, Jefferson; Charles L. Innis, Jr., Paxton, all of Mass.

[73] Assignee: Morgan Construction Company, Worcester, Mass.

[21] Appl. No.: 693,796

[22] Filed: Jan. 23, 1985

[51] Int. Cl.[4] ............................................. F16S 15/32
[52] U.S. Cl. ..................................... 277/152; 277/164
[58] Field of Search ....................... 277/152, 153, 164

[56] References Cited

U.S. PATENT DOCUMENTS

| | | | |
|---|---|---|---|
| 4,015,818 | 4/1977 | Tawakol | 277/164 |
| 4,165,881 | 8/1979 | Salter | 277/152 |
| 4,234,196 | 11/1980 | Iida | 277/152 |
| 4,379,558 | 4/1983 | Pippert | 277/164 |

Primary Examiner—Robert I. Smith
Attorney, Agent, or Firm—Thompson, Birch, Gauthier & Samuels

[57] ABSTRACT

A seal for use on the tapered section of a roll neck in a rolling mill. The seal has a flexible circular body with a circular lip and a circular flange at one end thereof. The lip extends axially from the body and the flange extends radially from the body and normal or perpendicular with respect to the body axis when the seal is in an unstressed condition. The seal is adapted to be axially received on and to be radially stressed by the tapered roll neck section with an accompanying radial expansion of the lip which produces a circumferential bending moment tending to angularly distort the flange from its perpendicular orientation to the seal axis. An internal circular shoulder on the seal body, coacts with the tapered roll neck section to counteract the bending moment and thereby prevent distortion of the flange.

10 Claims, 4 Drawing Figures

NECK SEAL

BACKGROUND OF THE INVENTION

1. Field of the Invention

This invention relates to neck seals of the type employed on the roll necks of rolls in a rolling mill.

2. Description of the Prior Art

FIG. 1 illustrates a prior art neck seal 10 of the type described in U.S. Pat. No. 4,165,881 (Salter). The seal has a molded flexible circular seal body 12 internally reinforced by an embedded combination of a coiled spring 14 and steel cable 16. The seal body has circular water-side and oil-side lips 18, 20, circular water-side and oil-side flanges 22, 24, and a circular oil flinger 26. When the seal is in the unstressed condition shown in FIG. 1, the water-side lip 18 extends axially from one end of the seal body, the oil-side lip 20 extends angularly inwardly from the seal body, and the flanges 22, 24 extend radially from the body in perpendicular relationship with respect to the seal axis schematically depicted at "a". The flanges 22, 24 are axially separated by a cylindrical exterior surface 28, and each flange is provided with a peripheral flexible lip 30 extending angularly outwardly from a heel portion 32.

As shown in FIG. 2, the seal 10 is adapted to be mounted on the tapered section 34 of a rolling mill roll neck 36 which in turn is rotatably supported in an oil film bearing. The bearing includes a sleeve 38 fixed to the roll neck by conventional means (not shown) for rotation therewith. The sleeve 38 has an outer cylindrical bearing surface which is journalled for rotation within an interior bearing surface of a fixed bushing 40. The bushing is carried in a bearing chock 42.

The sleeve rotates with the roll neck while the bearing chock and the bushing remain stationary. Oil in flooding quantity is fed continuously between the bearing surfaces of the sleeve 38 and bushing 40. A circular extension 44 of the bearing chock provides a sump 46 in which the oil emerging from between the bearing surfaces is continuously collected. The oil may be drawn away from the sump through a suitable piping connection (not shown) to be cooled and filtered before being recycled back to the bearing surfaces.

Where the roll is operating under "wet" conditions, water is constantly flooding over the roll barrel 48 and down over its end face 50. In spite of the centrifugal forces which tend to throw the water off of the roll, some of the water tends to work its way along the roll neck in the direction of the bearing. The objective of the seal assembly generally indicated at 52 and the flexible neck seal 10 which forms a component part thereof is to prevent any of the water from infiltrating into the bearing and contaminating the bearing oil while at the same time preventing loss of oil from the bearing.

In addition to the flexible seal 10, the seal assembly 52 includes a rigid circular seal end plate 54 which is mounted on and fixed relative to the roll chock 42. The seal end plate has a radially inwardly extending rigid circular flange or "dam" 56 which is perpendicular to the bearing axis. The inner edge of the dam is spaced radially from the exterior cylindrical surface 28 on the flexible seal body. The seal end plate further includes shoulders 58 extending in opposite directions from the base of the dam 56. Each of the shoulders 58 has a cylindrical shoulder surface 60 which is parallel to the bearing axis. The cylindrical shoulder surfaces 60 surround the flexible seal flanges 22, 24, and are arranged to be slidingly contacted by the flexible lips 30.

The seal assembly 52 also includes an inner seal ring 62 with resilient buttons 64 engaging the end face 50 of the roll. The inner edge of the inner seal ring contacts the flexible seal body 12 at the juncture 66 of the lip 18 and flange 22. An outer seal ring 68 surrounds the inner seal ring 62. A metal reinforcing band 70 encircles the cylindrical outer surface 28 of the seal body 12.

During a rolling operation, the above-described arrangement will operate in the following manner: the inner seal ring 62, flexible neck seal 10 and sleeve 38 will rotate with the roll neck. The outer seal ring 68, seal end plate 54, chock 42 and bushing 40 will remain stationary. Lubricating oil will constantly flow from between the bearing surfaces of the sleeve 38 and bushing 40. Most of this oil will be turned back by the rotation flinger 26 on the neck seal and will thus be directed to the sump 46. Oil which succeeds in passing by the flinger 26 will be turned back by the rotation oil-side flange 24 and will be prevented from escaping between the flange 24 and the shoulder surface 60 by the flexible lip 30 which sealingly engages the shoulder surface. Likewise, the major portion of the water applied to the roll will be turned back by the rotating inner seal ring 62. Any water which succeeds in passing by the inner seal ring will be turned back by the rotating water-side flange 22 on the neck seal and will be prevented from passing between the flange and its surrounding shoulder surface by the flexible lip 30.

Although the above-described arrangement operates in a generally satisfactory manner, experience has indicated that when the seal is mounted on the tapered roll neck section 34, the seal body is radially stressed and the water-side lip 18 is radially expanded. Radial expansion of the lip 18 subjects the seal body to a circumferential bending moment $M_1$ which tends to distort the water-side flange 22 from its relaxed perpendicular orientation with respect to the seal axis as illustrated in FIG. 1, to the angularly distorted position shown in FIG. 2. Thus, as the roll 48 undergoes axial shifting to the right as viewed in FIG. 2, the angular disposition of the flange 22 causes its heel 32 to come into frictional contact with the dam 56 of the seal end plate 54. This can lead to premature wearing of the flange 22 in the region of its heel 32, which in turn can cause leakage.

SUMMARY OF THE INVENTION

The primary objective of the present invention is to provide a means of counteracting the bending moment $M_1$ tending to angularly deflect the water-side flange. In a preferred embodiment of the invention to be described hereinafter in greater detail, this is accomplished by providing the seal body with an inwardly protruding circular shoulder which coacts with the tapered roll neck section to produce a corrective bending moment in opposition to the bending moment produced by radial expansion of the water-side lip. The opposed bending moments effectively neutralize one another, thereby permitting the water-side flange to remain perpendicular to the seal axis when the seal is axially received on and radially stressed by the tapered roll neck section.

Preferably, the water-side seal flange is thickened at its base region adjacent to the seal body. This thickening stiffens the flange and thereby assists in maintaining the flange in the desired perpendicular orientation with respect to the seal axis.

The inwardly protruding circular shoulder provides an additional sealing line between those provided by oil-side and water-side lips, thereby further enhancing the overall sealing integrity of the seal assembly.

DETAILED DESCRIPTION OF ILLUSTRATED EMBODIMENT

Figure 1:
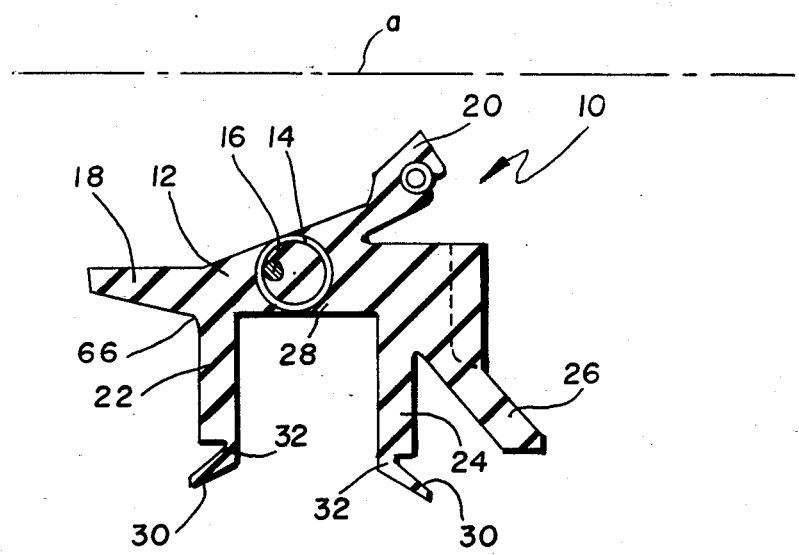
FIG. 1 is a cross-sectional view of a prior art neck seal.
Figure 2:
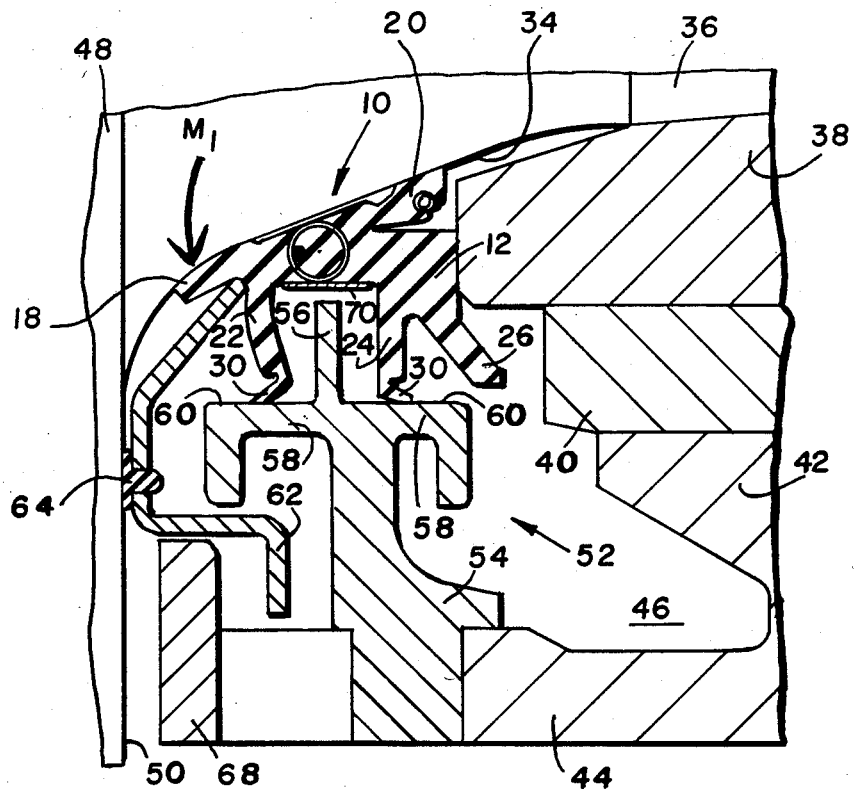
FIG. 2 is a cross-sectional view of an oil film bearing and associated seal assembly including the prior art seal of FIG. 1.
Figure 3:
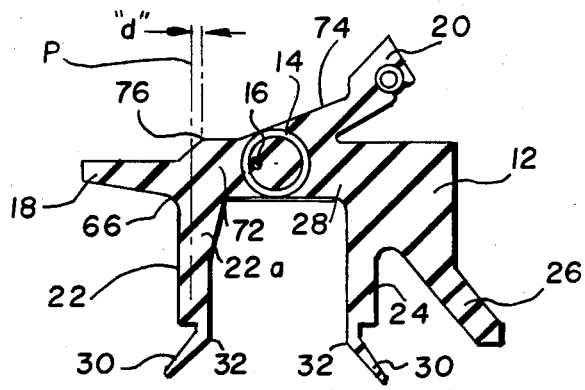
FIG. 3 is a cross-sectional view of a neck seal in accordance with the present invention.

A seal in accordance with the present invention will now be described with reference to FIGS. 3 and 4, where the same reference numerals have been employed to designate components which are essentially the same as those of the prior art as illustrated in FIGS. 1 and 2.

The neck seal 10 of the present invention is characterized by a circular shoulder 72 protruding inwardly from the tapered interior surface 74 of the seal body 12. Shoulder 72 is preferably provided with a triangular cross-sectional profile, and its apex 76 is aligned radially with the water-side flange 22. Advantageously, the apex 76 is axially offset by a distance "d" with respect to a reference plane P bisecting the radial outer portion of the flange 22. The offset is on the side of plane P opposite to that occupied by the water-side lip 18.

The water-side flange 22 is preferably provided with a base portion 22a of increased thickness extending from the cylindrical exterior surface 28 of the seal body 12 to approximately the radial midpoint of the flange. The base portion preferably has a truncated right triangular cross-sectional configuration, with the "hypotenuse" side facing the oil-side flange 24.

Figure 4:
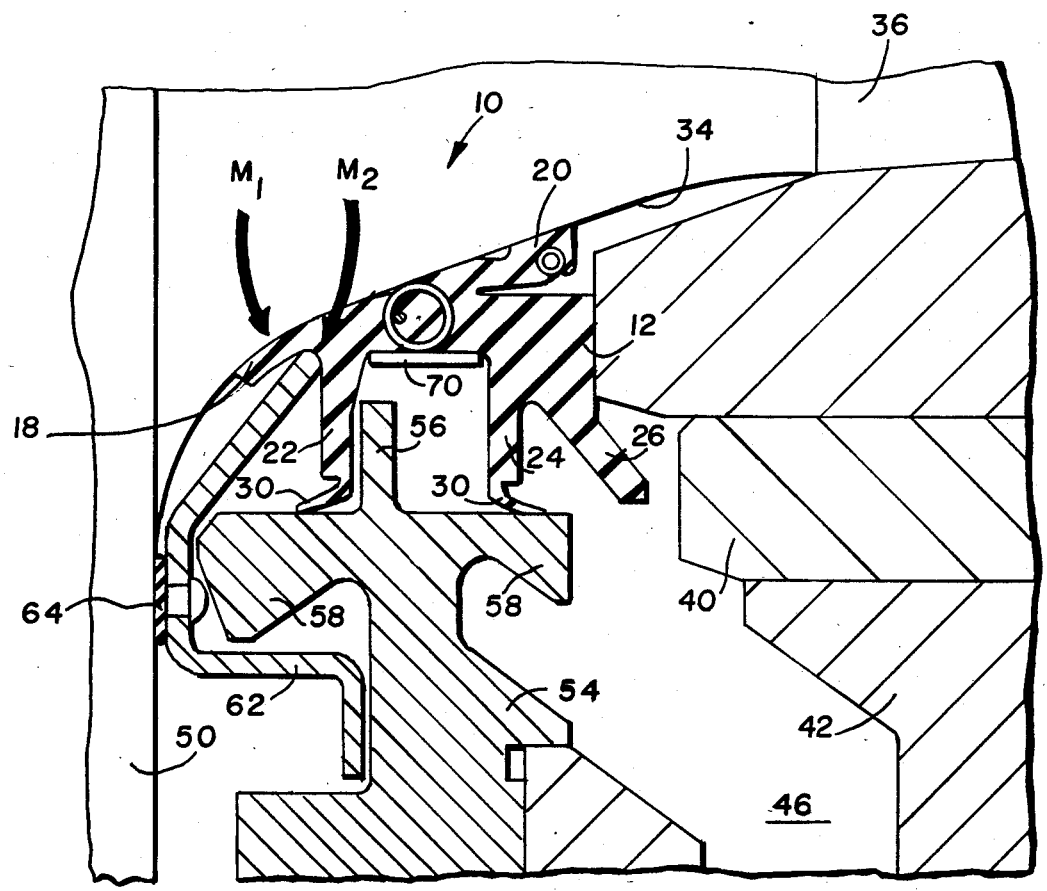
FIG. 4 is a sectional view showing the neck seal of the present invention mounted on the tapered section of a rolling mill roll neck.

As illustrated diagramatically in FIG. 4, the shoulder 72 coacts with the tapered roll neck section 34 to produce a second circumferential bending moment $M_2$ acting on the seal body 12 in opposition to the circumferential bending moment $M_1$ produced by the radial expansion of the water-side lip 18. Bending moment $M_2$ effectively counteracts bending moment $M_1$, with the result that the water-side flange 22 is maintained in the desired attitude perpendicular to the seal axis, and parallel to the dam 56.

The counteracting effect of bending moment $M_2$ is enhanced by the increased flange stiffness at the thickened base portion 22a. The tapered configuration of the base portion 22a avoids damaging frictional contact with the dam 56.

A secondary benefit provided by shoulder 72 is that it provides an additional sealing line between those afforded by the water-side and oil-side lips 18, 20. This further diminishes the likelihood of fluid seepage (oil or cooling water) between the roll surface and the seal.

We claim:

1. A seal for use on the tapered section of a roll neck in a rolling mill, said seal comprising: a flexible circular body having a circular lip and a circular flange at one end thereof, said flange extending radially from said body and normally with respect to the body axis when said seal is in an unstressed condition, said lip extending axially from said body on one side of a reference plane normal to the body axis and extending through said flange, said seal being adapted to be axially received on and to be radially stressed by said tapered roll neck section with an accompanying radial expansion of said lip which produces a first bending moment tending to angularly distort said flange from its normal orientation to the seal axis, and an inwardly protruding circular shoulder on said seal body located on the opposite side of said reference plane, said shoulder being arranged to coact with said tapered roll neck section in producing a second bending moment counteracting said first bending moment.

2. The seal of claim 1 wherein said shoulder is located on a tapered interior surface of the body.

3. The seal of claim 1 wherein said shoulder has a triangular cross-sectional profile.

4. The seal of claim 3 wherein the apex of said cross-sectional profile is aligned radially with said circular flange.

5. The seal of in accordance with any one of claims 1 or 3-4 wherein said flange has a base portion of increased thickness adjacent to said body.

6. The seal of claim 5 wherein said base portion has a truncated triangular cross-sectional profile.

7. The seal of claim 1 further comprising a second flange extending radially from said seal body, said second flange being spaced axially from the first-mentioned flange by a cylindrical exterior surface on said body, said flanges being arranged in parallel relationship when said seal is in an unstressed condition, with said first bending moment tending to angularly deflect the first-mentioned flange towards said second flange.

8. The seal of claim 7 further comprising a metal retaining band encircling said cylindrical exterior surface.

9. The seal of claim 1 further comprising an additional lip extending angular inwardly from said body and away from the first-mentioned lip, said lips and said shoulder each being in sealing contact with said tapered roll neck section when said seal is axially received thereon.

10. A seal for use on the tapered section of a roll neck in a rolling mill, comprising:
a flexible circular seal body;
a circular lip and first and second flanges on said seal body, said lip and said first flange being located at one end of said body and said second flange being spaced axially from said first flange, said first and second flanges extending radially from said body and perpendicular with respect to the seal body axis when said seal is in an unstressed condition, said lip extending axially from said seal body on one side of a reference plane normal to the seal body axis and extending through said first flange, said seal being adapted to be axially received on and to be radially stressed by said tapered roll neck section with an accompanying radial expansion of said lip which produces a circumferential first bending moment tending to angularly deflect said first flange towards said second flange; and
means for counteracting said first bending moment, said means comprising an inwardly protruding circular shoulder on said seal body located on the opposite side of said reference plane, said shoulder being arranged to coact with said tapered roll neck section to produce a second circumferential bending moment in opposition to said first bending moment.

* * * * *